(12) United States Patent
Hoo (10) Patent No.: US 12,374,121 B1
(45) Date of Patent: Jul. 29, 2025

(54) VIRTUAL STEREO RANGING SYSTEMS AND METHODS

(71) Applicant: SUBARU CORPORATION, Tokyo (JP)

(72) Inventor: John Hoo, Van Buren Township, MI (US)

(73) Assignee: SUBARU CORPORATION, Tokyo (JP)

( * ) Notice: Subject to any disclaimer, the term of this patent is extended or adjusted under 35 U.S.C. 154(b) by 31 days.

(21) Appl. No.: 18/427,564

(22) Filed: Jan. 30, 2024

(51) Int. Cl.
*G06V 20/56* (2022.01)
*G06T 7/593* (2017.01)
*G06V 10/25* (2022.01)
*G08G 1/16* (2006.01)
*H04N 23/23* (2023.01)

(52) U.S. Cl.
CPC .............. *G06V 20/56* (2022.01); *G06T 7/593* (2017.01); *G06V 10/25* (2022.01); *G08G 1/16* (2013.01); *H04N 23/23* (2023.01); *G06T 2207/30252* (2013.01); *G06V 2201/07* (2022.01)

(58) Field of Classification Search
CPC . G06T 2207/10028; G06T 2207/10024; G06T 2207/20081; G06T 2207/20084; G06T 2207/30252; G06T 7/593; G06T 7/50; G06T 7/70; G06T 15/08; G06T 7/521; G06V 10/776; G06V 10/809; G06V 20/10
See application file for complete search history.

(56) References Cited

U.S. PATENT DOCUMENTS

| | | | |
|---|---|---|---|
| 10,885,671 B2 | 1/2021 | Hsieh et al. | |
| 2013/0010073 A1* | 1/2013 | Do | H04N 13/257 |
| | | | 348/46 |
| 2020/0334860 A1* | 10/2020 | Hsieh | H04N 13/239 |
| 2020/0336655 A1 | 10/2020 | Hsieh et al. | |
| 2020/0410705 A1* | 12/2020 | Huang | G06T 5/50 |
| 2024/0125934 A1* | 4/2024 | Shen | G06V 10/776 |

FOREIGN PATENT DOCUMENTS

TW 201926252 A * 7/2019

* cited by examiner

*Primary Examiner* — Masum Billah
(74) *Attorney, Agent, or Firm* — Rimon P.C.

(57) ABSTRACT

Aspects of the subject technology relate to systems and methods for virtual stereo ranging in a vehicle. A visible-light image and a thermographic image of a surrounding environment of a vehicle are respectively received from a visible-light image sensor and a thermographic image sensor. A visible-light depth map and a thermographic depth map of the surrounding environment are respectively generated based on the visible-light image and the thermographic image using a monocular ranging method. A first boundary surrounding a first object and a second boundary surrounding a second object in the surrounding environment are respectively generated in the visible-light image and the thermographic image. Based on the first and second boundaries, a stereo depth map of the surrounding environment is generated using a stereo ranging method. Driving of the vehicle is controlled based on the visible-light depth map, the thermographic depth map, and the stereo depth map.

12 Claims, 5 Drawing Sheets

VIRTUAL STEREO RANGING SYSTEMS AND METHODS

BACKGROUND

Field

The present disclosure generally relates to virtual stereo ranging systems and methods for vehicles.

Description of the Related Art

Vehicles use depth maps of a surrounding environment to control driving. Specifically, vehicles refer to the depth maps to determine the distances from the vehicle to the objects in the surrounding environment and control driving of the vehicle to avoid colliding with the objects. Thus, an improved depth estimation technology in traffic scenes can effectively improve safety and reduce the likelihood of accidents or collisions on the road.

The description provided in the background section should not be assumed to be prior art merely because it is mentioned in or associated with the background section. The background section may include information that describes one or more aspects of the subject technology.

SUMMARY

The disclosed subject matter relates to systems and methods for virtual stereo ranging in a vehicle. In accordance with various aspects of the subject disclosure, a computer-implemented method includes receiving, from a visible-light image sensor, visible-light image data of a surrounding environment of a vehicle, generating, using a monocular ranging method, a visible-light depth map of the surrounding environment of the vehicle based on the visible-light image data, receiving, from an infrared image sensor, IR image data of the surrounding environment of the vehicle, generating, using the monocular ranging method, an IR depth map of the surrounding environment of the vehicle based on the IR image data, identifying a first object in the surrounding environment in the visible-light image data, generating a first boundary surrounding the identified first object in the visible-light image data, identifying a second object in the surrounding environment in the IR image data, generating a second boundary surrounding the second object in the IR image data, generating, using a stereo ranging method, a stereo depth map of the surrounding environment of the vehicle based on the first boundary in the visible-light image data and the second boundary in the IR image data, and controlling driving of the vehicle based on the visible-light depth map, the IR depth map, and the stereo depth map.

It is understood that other configurations of the subject technology will become readily apparent to those skilled in the art from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description may include specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

Vehicles may be equipped with advanced driving assist systems (ADAS). The ADAS are designed to assist drivers in operating their vehicles more safely and efficiently. For example, the ADAS provide feedback to a driver or automatically controls the vehicle in response to detecting any hazardous objects in a surrounding environment of the vehicle. Some of the functionalities of the ADAS include forward collision warning, pedestrian detection, automatic emergency braking, adaptive cruise control, lane departure warning, and blind spot detection. The functionalities of the ADAS are not limited to those listed above, but may include more or less.

For example, the ADAS collect data of the surrounding environment of the vehicle through various sensors on the vehicle to detect potential hazards in the surrounding environment and to provide feedback or assistance to the driver based on the data. By providing the feedback or assistance to the drivers in response to detecting potential hazards in the surrounding environment, the ADAS aim to improve safety and reduce the likelihood of accidents or collisions on the road.

One type of the various sensors that the ADAS use to collect the data of the surrounding environment is an image sensor (i.e., camera). For instance, the ADAS collect, from one or more front-facing cameras mounted on a vehicle, images of a forward environment of the vehicle. Then, the ADAS process the collected images to detect objects in the forward environment. When one or more of the detected objects are deemed hazardous to the vehicle, the ADAS control various driving functionalities of the vehicle to avoid colliding with the hazardous objects.

To determine the objects to be hazardous, the ADAS perform stereo matching using two images respectively captured by two cameras. The two cameras used in the ADAS are typically of the same type (e.g., two RGB cameras). Because the two cameras are of the same type, the images generated by those two cameras will be of the same type. Then, the ADAS can easily evaluate similarities of the corresponding sections of the two images of the same type using a Zero-mean Sum of Absolute Difference (ZSAD) method, find the parallax of the two images based on the similarities, perform stereo matching based on the parallax to determine the positions of the objects, and perform stereo ranging based on the positions of the objects to measure the distances to the objects from the cameras.

Typical ADAS use two RGB cameras. RGB cameras are known to capture the same type of visual information that humans see. For example, RGB cameras capture visible light in daylight or well-lit conditions and can accurately reproduce colors in images based on the captured visible light. However, similar to human eyes, RGB cameras have limitations, for example, in low light conditions (e.g., nighttime), with light glares (e.g., sunrise/sunset or harsh light reflecting off the surfaces of the objects), and in low visibility conditions (e.g., heavy rain or fog).

On the other hand, infrared (IR) cameras have advantages over the limitations of RGB cameras. IR cameras measure the temperature of objects based on the amount of infrared radiation the objects emit, and produce thermal images that show the temperature distributions of the objects. Because IR cameras produce thermal images based on the temperature distributions of the objects and not based on the amount of ambient light, IR cameras are less affected by the low light conditions, light glares, or low visibility conditions.

IR cameras can be used in combination with RGB cameras to complement the limitations of the RGB cameras. However, mounting one or more IR cameras in addition to the two front-facing RGB cameras takes up more space on windshield, adds cost to manufacturing, and adds extra weight on the vehicle leading to the energy inefficiency. To address the disadvantages of mounting additional IR cameras, a number of IR cameras to be mounted can be reduce to one IR camera and a number of RGB cameras to be mounted can also be reduced to one RGB camera.

However, since the ZSAD method used for stereo matching can be used to find similarities only in the same type of images (e.g., two RGB images), replacing one of the two RGB images with a thermal (IR) image when performing stereo matching creates a problem that the ZSAD method can no longer be used to find similarities between the RGB image and the IR image. When the similarities cannot be found between the RGB image and the IR image, it would be difficult to perform the stereo matching and stereo ranging using the RGB image and the IR image. For this, there is needed a system and method for performing stereo matching and stereo ranging using two images of different types (e.g., RGB image and IR image).

Figure 1:
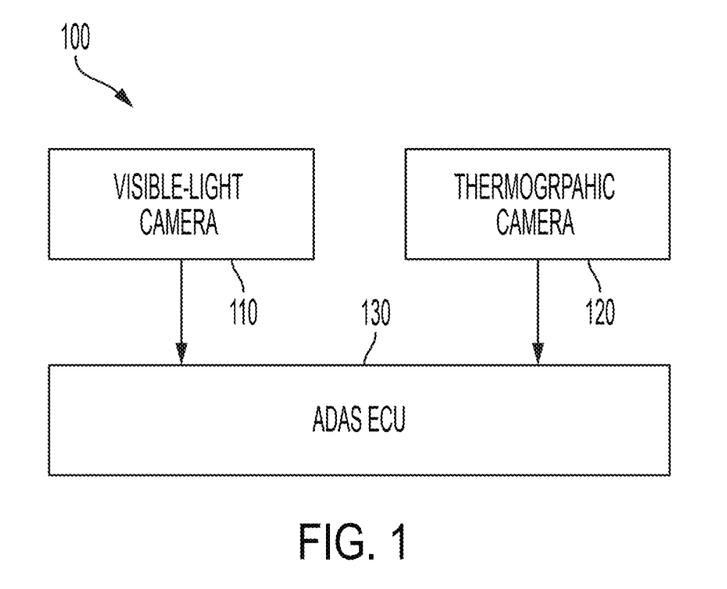
FIG. 1 depicts a block diagram of an exemplary powertrain system of a vehicle according to example aspects of the subject technology.

FIG. 1 depicts a block diagram of an exemplary system 100 equipped in a vehicle according to example aspects of the subject technology. As shown in FIG. 1, the system 100 includes a visible-light camera 110, a thermographic camera 120, and an ADAS (Advanced Driver Assistance System) ECU (electronic control unit) 130. For example, in the system 100, the visible-light camera 110 and the thermographic camera 120 capture images and transmit image data of the captured images to the ADAS ECU 130 that processes the image data and generates output signals appropriate for the functionalities of ADAS. The system 100 includes only a single visible-light camera 110 and a single thermographic camera 120. The images captured by the visible-light camera 110 and the thermographic camera 120 may be two-dimensional (2D) images.

The visible-light camera 110 may be mounted on the vehicle to capture images of a surrounding environment of the vehicle. In some embodiments, the visible-light camera 110 is mounted on the vehicle to face front and capture images of a forward environment of the vehicle. The visible-light camera 110 includes a visible-light image sensor with arrays of individual pixels, and reads the color information from each pixel to produce one or more visible-light images (e.g., color (RGB) images) of the surrounding environment of the vehicle. For example, the visible-light camera 110 can be any image capturing device that includes a visible-light image sensor, such as a RGB camera.

The thermographic camera 120 may be mounted on the vehicle to capture images of the surrounding environment of the vehicle. In some embodiments, the thermographic camera 120 is mounted on the vehicle to face front and capture images of the forward environment of the vehicle. The thermographic camera 120 includes an infrared image sensor that detects infrared radiation emitted by one or more objects in the surrounding environment to produce one or more thermal (IR) images of the surrounding environment of the vehicle. For example, the thermographic camera 120 can be any image capturing device that includes an infrared image sensor, such as an IR camera.

For example, the visible-light camera 110 and the thermographic camera 120 may be mounted on the cabin side of a windshield and facing forward on either side of a rearview mirror of the vehicle. To simplify the description without limiting the scope of the description, the visible-light camera 110 is mounted closer to the driver side of the vehicle than the thermographic camera 120. That is, the visible-light camera 110 is mounted on the driver side of the rearview mirror, and the thermographic camera 120 is mounted on the passenger side of the rearview mirror. The placement of the visible-light camera 110 and the thermographic camera 120 are not limited to the above-described placement.

Figure 2A:
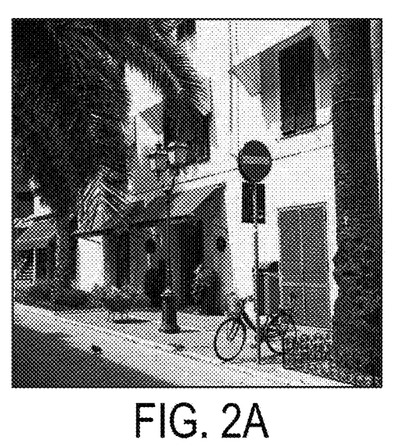
FIG. 2A illustrates an example visible-light image captured using a visible-light image sensor according to example aspects of the subject technology.
Figure 2B:
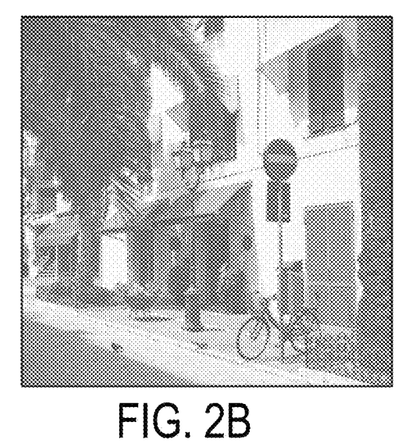
FIG. 2B illustrates an example IR image captured using an IR image sensor according to example aspects of the subject technology.

The ADAS ECU 130 receives the visible-light images from the visible-light camera 110 and the thermographic images from the thermographic camera 120. For example, the ADAS ECU 130 receives a visible-light image (shown in FIG. 2A) from the visible-light camera 110 and a thermographic image (shown in FIG. 2B) from the thermographic camera 120 that were captured at the same time as each other. Upon receiving the visible-light image and the thermographic image, the ADAS ECU 130 generates, using a monocular ranging method, a visible-light depth map and a thermographic depth map of the surrounding environment of the vehicle based on the visible-light image and the thermographic image, respectively. For example, the monocular ranging method estimates a distance from a camera to an object in the surrounding environment using visual cues, such as size and perspective of the object.

Figure 2C:
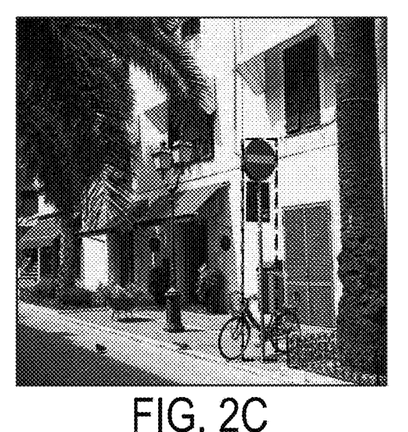
FIG. 2C illustrates an example boundary in a visible-light image according to example aspects of the subject technology.
Figure 2D:
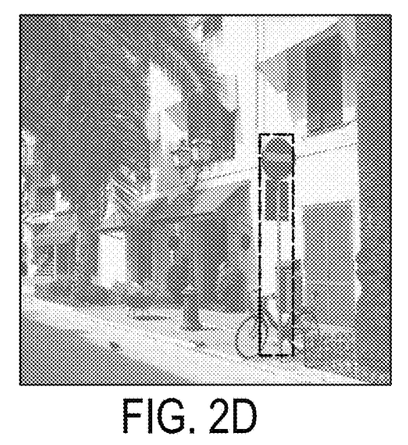
FIG. 2D illustrates an example boundary in an IR image according to example aspects of the subject technology.
Figure 2E:
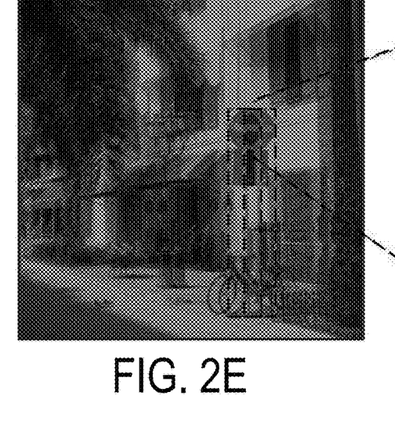
FIG. 2E illustrates a parallax image according to example aspects of the subject technology.
Figure 2F:
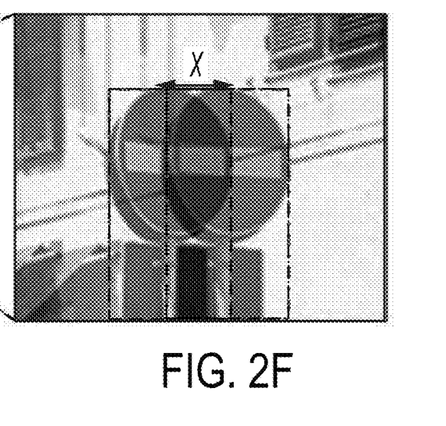
FIG. 2F illustrates an enlarged view of the parallax image according to example aspects of the subject technology.

Further, the ADAS ECU 130 identifies one or more objects in the surrounding environment captured in the visible-light image and the thermographic image by generating a boundary (e.g., box) surrounding each of the one or more objects in both the visible-light image (shown in FIG. 2C) and the thermographic image (shown in FIG. 2D). In response to identifying the one or more objects, the ADAS ECU 130 overlaps the visible-light image and the thermographic image each other. The ADAS ECU 130 determines a parallax X between the visible-light image and the thermographic image (shown in FIGS. 2E and 2F) based on the boundaries in the overlapped visible-light image and thermographic image. Based on the determined parallax, the ADAS ECU 130 performs stereo matching and stereo ranging to generate a stereo depth map of the surrounding environment of the vehicle.

The ADAS ECU 130 uses the visible-light depth map, the thermographic depth map, and the stereo depth map to determine whether there are any potentially hazardous objects in a travel path of the vehicle. When one or more of the potentially hazardous objects are detected, the ADAS ECU 130 generates output signals to control various systems to perform one or more functionalities of the ADAS to avoid the potentially hazardous objects.

Figure 3:
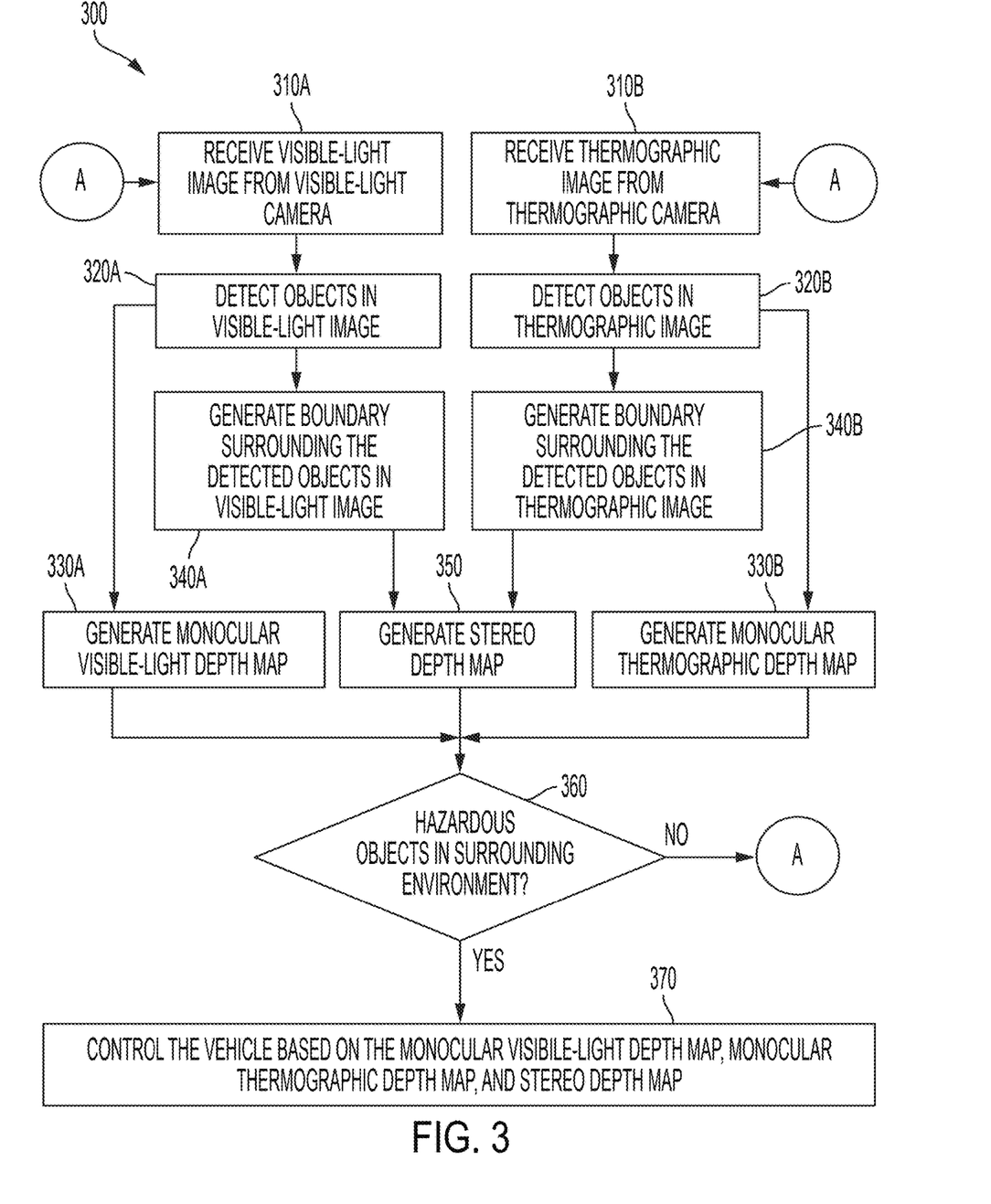
FIG. 3 depicts a flow diagram of an example process for performing virtual stereo ranging according to aspects of the subject technology.

FIG. 3 depicts a flow diagram 300 of an example process for performing virtual stereo ranging according to aspects of the subject technology. For explanatory purposes, the example process of FIG. 3 is described herein with reference to the components of FIG. 1. Further for explanatory purposes, the blocks of the example process of FIG. 3 are described herein as occurring in serial, or linearly. However, multiple blocks of the example process of FIG. 3 may occur in parallel. In addition, the blocks of the example process of FIG. 3 need not be performed in the order shown and/or one or more of the blocks of the example process of FIG. 3 need not be performed.

At block 310A, the ADAS ECU 130 receives, from the visible-light camera 110, a visible-light image (e.g., color (RGB) image) of the surrounding environment of the vehicle. For example, the ADAS ECU 130 receives a visible-light image (shown in FIG. 2A) captured by the visible-light camera 110 at a certain time (e.g., 2:00 PM). At block 310B, the ADAS ECU 130 receives, from the thermographic camera 120, a thermographic (IR) image of the surrounding environment of the vehicle. For example, the ADAS ECU 130 receives a thermographic image (shown in FIG. 2B) captured by the thermographic camera 120 at the same time (e.g., 2:00 PM) as the visible-light image was captured by the visible-light camera 110. The visible-light image and the thermographic image are both two-dimensional images.

At block 320A, the ADAS ECU 130 detects, from the received visible-light image, objects in the surrounding environment of the vehicle. At block 320B, the ADAS ECU 130 detects, from the received thermographic image, objects in the surrounding environment of the vehicle. The objects detected in block 320A may exactly match the objects detected in block 320B. In some embodiments, one or more objects from the objects detected in block 320A match the objects detected in block 320B.

At block 330A, the ADAS ECU 130 generates, using a monocular ranging method, a monocular visible-light depth map of the surrounding environment of the vehicle based on the received visible-light image. For example, the ADAS ECU 130 uses the monocular ranging method to estimate the distances from the visible-light camera to the detected objects in the surrounding environment of the vehicle. The distance estimations allow the ADAS ECU 130 to generate the monocular visible-light depth map of the surrounding environment of the vehicle.

At block 330B, the ADAS ECU 130 generates, using the monocular ranging method, a monocular thermographic depth map of the surrounding environment of the vehicle based on the received thermographic image. For example, the ADAS ECU 130 uses the monocular ranging method to estimate the distances from the thermographic camera to the detected objects in the surrounding environment of the vehicle. The distance estimations allow the ADAS ECU 130 to generate the monocular thermographic depth map of the surrounding environment of the vehicle.

At block 340A, the ADAS ECU 130 generates boundaries respectively surrounding the detected objects in the visible-light image. For example, as shown in FIG. 2C, the ADAS ECU 130 generates a boundary surrounding a road sign in the visible-light image.

At block 340B, the ADAS ECU 130 generates boundaries respectively surrounding the detected objected in the thermographic image. For example, as shown in FIG. 2D, the ADAS ECU 130 generates a boundary surrounding a road sign in the thermographic image.

Figure 4:
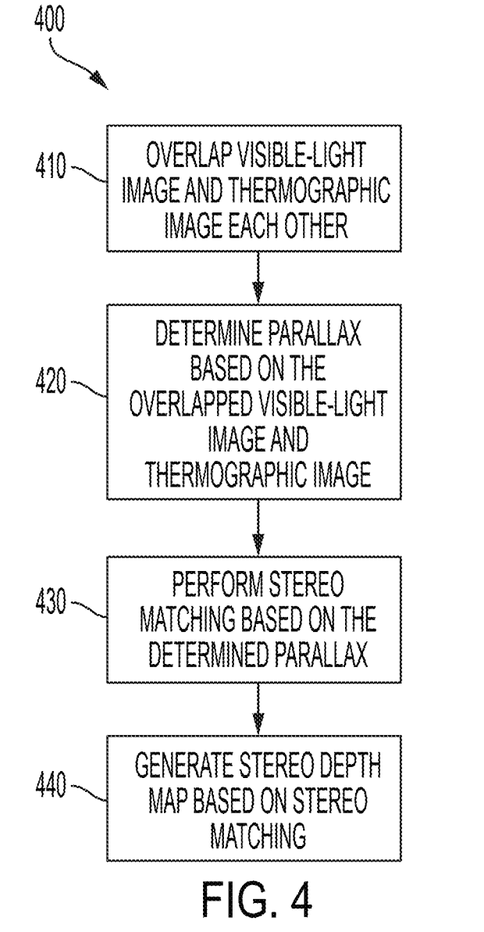
FIG. 4 illustrates a flow diagram of an example process for generating stereo depth map according to aspects of the subject technology.

At block 350, the ADAS ECU 130 generates a stereo depth map based on the boundaries in the visible-light image and the boundaries in the thermographic image. Further details of block 350 will be described with reference to FIG. 4 illustrating a flow diagram 400 of an example process for generating stereo depth map according to aspects of the subject technology.

At block 410, the ADAS ECU 130 arranges the visible-light image and the thermographic image to overlap one another. At block 420, the ADAS ECU 130 determines a parallax based on the overlapped visible-light image and thermographic image. For example, the ADAS ECU 130 identifies a boundary in the visible-light image and a boundary in the thermographic image based on the coordinates of the boundary in the visible-light image and the coordinates of the boundary in the IR image. The ADAS ECU 130 then calculates a displacement between the boundary of the visible-light image and the boundary of the thermographic image. The calculated displacement is the parallax.

At block 430, the ADAS ECU 130 performs stereo matching based on the determined parallax. At block 440, the ADAS ECU 130 generates a stereo depth map based on stereo matching performed in block 430.

Returning to block 360 of FIG. 3, the ADAS ECU 130 determines whether there are hazardous objects in the surrounding environment of the vehicle based on the monocular visible-light depth map, the monocular thermographic depth map, and the stereo depth map. For example, the ADAS ECU 130 determines whether any objects in the surrounding environment is in the travel path of the vehicle based on the monocular visible-light depth map, the monocular thermographic depth map, and the stereo depth map. When one or more hazardous objects are determined to be not in the surrounding environment (block 360=NO), the process 300 proceeds to block A where the process 300 returns to block 310A and block 310B.

When one or more hazardous objects are determined to be in the surrounding environment (block 360=YES), the process 300 proceeds to block 370 in which the ADAS ECU 130 controls the vehicle to avoid colliding with the one or more hazardous objects in the surrounding environment. For the ADAS ECU 130 generates output signals to control one or more driving systems (e.g., throttle control, anti-lock brake system, powertrain control, adaptive cruise control, etc.) of the vehicle to avoid collecting with the hazardous objects. In some embodiments, the ADAS ECU 130 may generate output signals to present warnings to alert the driver to avoid the collision.

Figure 5:
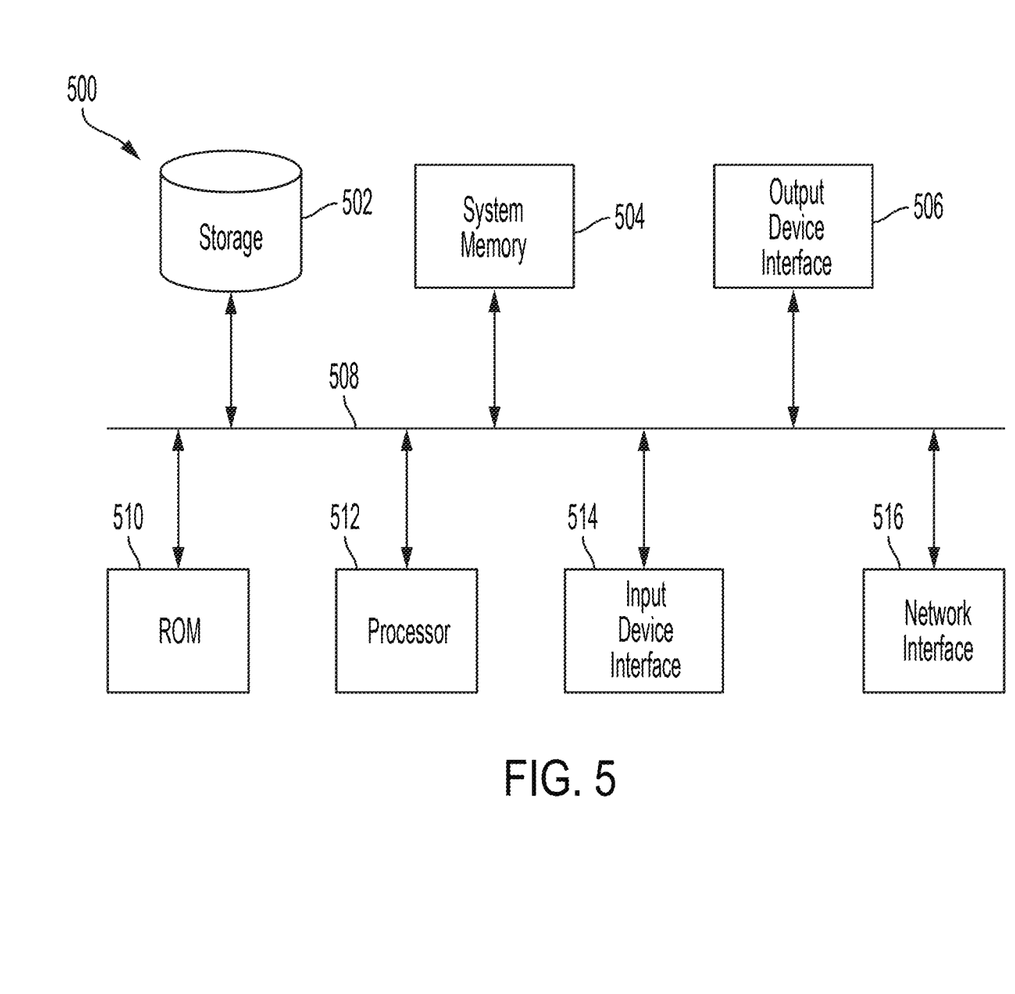
FIG. 5 is a block diagram illustrating an example electric system with which the system of FIG. 1 can be implemented according to example aspects of the subject technology.

FIG. 5 is a block diagram illustrating an exemplary electronic system 500 with which the ADAS ECU 130 of FIG. 1 can be implemented to perform stereo ranging and control the vehicle. In certain aspects, the electronic system 500 may be implemented using hardware or a combination of software and hardware, either in a dedicated electronic control unit (ECU), or integrated into another entity, or distributed across multiple entities. Electronic system 500 (e.g., ADAS ECU 130) includes a bus 508, a processor 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processor 512 with ROM 510, system memory 504, and permanent storage device 502.

From these various memory units, processor 512 retrieves instructions to execute and data to process in order to execute the processes of the subject disclosure. The processor 512 can be a single processor or a multi-core processor in different implementations.

ROM 510 stores static data and instructions that are needed by processor 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (for example, a magnetic or optical disk, or flash memory) as permanent storage device 502.

Other implementations use a removable storage device (for example, a flash drive) as permanent storage device 502. Like permanent storage device 502, system memory 504 is a read-and-write memory device. However, unlike storage device 502, system memory 504 is a volatile read-and-write memory, such as a random access memory. System memory 504 stores some of the instructions and data that the processor needs at runtime. In some implementations, the processes of the subject disclosure are stored in system memory 504, permanent storage device 502, or ROM 510. For example, the various memory units include instructions for displaying graphical elements and identifiers associated with respective applications, receiving a predetermined user input to display visual representations of shortcuts associated with respective applications, and displaying the visual representations of shortcuts. From these various memory units, processor 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interfaces 506 enables, for example, the display of images generated by the electronic system 500 (e.g., accelerator pedal maps). Output devices used with output device interface 506 include, for example, display devices, for example, cathode ray tubes (CRT) or liquid crystal displays (LCD). Some implementations include devices, for example, a touchscreen that functions as both input and output devices.

Finally, as shown in FIG. 5, bus 508 also couples electronic system 500 to a network (not shown) through a network interface 516. In this manner, the computer can be a part of a network of computers (for example, a CAN, a LAN, a WAN, or an Intranet, or a network of networks, for example, the Internet). Any or all components of electronic system 500 can be used in conjunction with the subject disclosure.

Many of the above-described features and applications are implemented as software processes that are specified as a set of instructions recorded on a computer readable storage medium (also referred to as computer readable medium). When these instructions are executed by one or more processors (e.g., one or more processors, cores of processors, or other processing units), they cause the processors to perform the actions indicated in the instructions. Examples of computer readable media include, but are not limited to, magnetic media, optical media, electronic media, etc. The computer readable media does not include carrier waves and electronic signals passing wirelessly or over wired connections.

In this specification, the term "software" is meant to include, for example, firmware residing in read-only memory or other form of electronic storage, or applications that may be stored in magnetic storage, optical, solid state, etc., which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware, or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example, microprocessors, storage, and memory that store computer program instructions in a machine-readable or computer-readable medium (alternatively referred to as computer-readable storage media, machine-readable media, or machine-readable storage media). Such electronic components are implemented by circuitry including, for example, one or more semiconductor integrated circuits. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra-density optical discs, any other optical or magnetic media, and floppy disks. The computer-readable media can store a computer program that is executable by at least one processing unit and includes sets of instructions for performing various operations. Examples of computer programs or computer code include machine code, for example, is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example, application specific integrated circuits (ASICs) or field programmable gate arrays (FPGAs). In some implementations, such integrated circuits execute instructions that are stored on the circuit itself. ASICs and FPGAs are also implemented by semiconductor integrated circuits.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It may be understood that the described instructions, operations, and systems can generally be integrated together in a single software/hardware product or packaged into multiple software/hardware products.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor may they be interpreted in such a way.

What is claimed is:

1. A computer-implemented method comprising:
   receiving, from a visible-light image sensor, visible-light image data of a surrounding environment of a vehicle;
   generating, using a monocular ranging method, a visible-light depth map of the surrounding environment of the vehicle based on the visible-light image data;
   receiving, from an infrared image sensor, thermographic image data of the surrounding environment of the vehicle;
   generating, using the monocular ranging method, a thermographic depth map of the surrounding environment of the vehicle based on the thermographic image data;
   identifying a first object in the surrounding environment in the visible-light image data;
   generating a first boundary surrounding the identified first object in the visible-light image data;
   identifying a second object in the surrounding environment in the thermographic image data;
   generating a second boundary surrounding the second object in the thermographic image data;
   generating, using a stereo ranging method, a stereo depth map of the surrounding environment of the vehicle based on the first boundary in the visible-light image data and the second boundary in the thermographic image data; and
   controlling driving of the vehicle based on the visible-light depth map, the thermographic depth map, and the stereo depth map.

2. The computer-implemented method of claim 1, wherein generating the stereo depth map includes determining that the first object in the visible-light image data and the second object in the thermographic image data refer to a same object in the surrounding environment based on a position of the first boundary surrounding the first object in the visible-light image data and a position of the second boundary surrounding the second object in the thermographic image data.

3. The computer-implemented method of claim 2, further comprising determining whether the same object in the surrounding environment is positioned in a traveling path of the vehicle using the visible-light depth map, the thermographic depth map, and the stereo depth map.

4. The computer-implemented method of claim 3, further comprising:
   when the same object in the surrounding environment is positioned in the traveling path of the vehicle, controlling the driving of the vehicle to avoid colliding with the same object.

5. A system comprising:
   a thermographic camera mounted on a vehicle;
   a visible-light camera mounted on the vehicle;
   circuitry that perform operations comprising:
     receiving, from the visible-light camera, visible-light image data of a surrounding environment of the vehicle;
     generating, using a monocular ranging method, a visible-light depth map of the surrounding environment of the vehicle based on the visible-light image data;
     receiving, from the thermographic camera, thermographic image data of the surrounding environment of the vehicle;
     generating, using the monocular ranging method, a thermographic depth map of the surrounding environment of the vehicle based on the thermographic image data;
     identifying a first object in the surrounding environment in the visible-light image data;
     generating a first boundary surrounding first object in the visible-light image data;
     identifying a second object in the surrounding environment in the thermographic image data;
     generating a second boundary surrounding the second object in the thermographic image data;
     generating, using a stereo ranging method, a stereo depth map of the surrounding environment of the vehicle based on the first boundary surrounding the first object in the visible-light image data and the second boundary surrounding the second object in the thermographic image data; and
     controlling driving of the vehicle based on the visible-light depth map, the thermographic depth map, and the stereo depth map.

6. The system of claim 5, wherein generating the stereo depth map includes determining that the first object surrounded by the first boundary in the visible-light image data and the second object surrounded by the second boundary in the thermographic image data refer to a same object in the surrounding environment based on a position of the first boundary in the visible-light image data and a position of the second boundary in the thermographic image data.

7. The system of claim 6, wherein the circuitry determines whether the same object in the surrounding environment is positioned in a traveling path of the vehicle using the visible-light depth map, the thermographic depth map, and the stereo depth map.

8. The system of claim 7, wherein, when the same object in the surrounding environment is positioned in the traveling path of the vehicle, the circuitry controls the driving of the vehicle to avoid colliding with the same object.

9. A non-transitory machine-readable medium encoded with executable instructions that, when executed by a processor, cause the processor to perform a method comprising:
   receiving, from a visible-light image sensor, a visible-light image data of a surrounding environment of a vehicle;
   generating, using a monocular ranging method, a visible-light depth map of the surrounding environment of the vehicle based on the visible-light image data;
   receiving, from an infrared (IR) image sensor, thermographic image data of the surrounding environment of the vehicle;
   generating, using the monocular ranging method, a thermographic depth map of the surrounding environment of the vehicle based on the thermographic image data;
   generating a first boundary surrounding a first object in the surrounding environment in the visible-light image;
   generating a second boundary surrounding a second object in the surrounding environment in the thermographic image data;
   generating, using a stereo ranging method, a stereo depth map of the surrounding environment of the vehicle based on the first boundary in the visible-light image data and the second boundary in the thermographic image data; and
   controlling driving of the vehicle based on the visible-light depth map, the thermographic depth map, and the stereo depth map.

10. The non-transitory machine-readable medium of claim 9, wherein generating the stereo depth map includes determining that the first object surrounded by the first boundary in the visible-light image data and the second object surrounded by the second boundary in the thermographic image data refer to a same object in the surrounding environment based on a position of the first boundary in the visible-light image data and a position of the second boundary in the thermographic image data.

11. The non-transitory machine-readable medium of claim 10, wherein the method further comprises determining whether the same object in the surrounding environment is positioned in a traveling path of the vehicle using the visible-light depth map, the thermographic depth map, and the stereo depth map.

12. The non-transitory machine-readable medium of claim 11, wherein the method further comprises, when the same object in the surrounding environment is positioned in the traveling path of the vehicle, controlling the driving of the vehicle to avoid colliding with the same object.

* * * * *